US008522011B2

(12) United States Patent
Spalka et al.

(10) Patent No.: US 8,522,011 B2
(45) Date of Patent: *Aug. 27, 2013

(54) COMPUTER IMPLEMENTED METHOD FOR AUTHENTICATING A USER

(75) Inventors: Adrian Spalka, Koblenz (DE); Jan Lenhardt, Koblenz (DE)

(73) Assignee: Compugroup Holding AG, Koblenz (DE)

( * ) Notice: Subject to any disclaimer, the term of this patent is extended or adjusted under 35 U.S.C. 154(b) by 101 days.

This patent is subject to a terminal disclaimer.

(21) Appl. No.: 12/904,388

(22) Filed: Nov. 3, 2010

(65) Prior Publication Data

US 2011/0154025 A1  Jun. 23, 2011

(30) Foreign Application Priority Data

Dec. 18, 2009  (EP) .................. 09 179 974
Mar. 11, 2010  (EP) .................. 10 156 171
Jun. 29, 2010  (EP) .................. 10 167 641
Aug. 18, 2010  (EP) .................. 10 173 175

(51) Int. Cl.
*H04L 29/00* (2006.01)

(52) U.S. Cl.
USPC ........... 713/156; 713/151; 713/169; 713/176; 713/186; 726/9; 705/64; 380/30; 380/44; 380/277; 380/281; 380/282

(58) Field of Classification Search
USPC ............ 713/156, 151, 169, 176, 186; 726/9; 380/30, 44, 277, 281, 282; 705/5
See application file for complete search history.

(56) References Cited

U.S. PATENT DOCUMENTS

| | | | |
|---|---|---|---|
| 6,230,269 B1* | 5/2001 | Spies et al. ............... | 713/182 |
| 6,950,523 B1* | 9/2005 | Brickell et al. ............ | 380/286 |
| 2004/0083182 A1* | 4/2004 | Moribatake et al. ........ | 705/64 |
| 2007/0089168 A1* | 4/2007 | Wang et al. .............. | 726/9 |
| 2007/0198848 A1* | 8/2007 | Bjorn .................... | 713/186 |
| 2008/0126794 A1* | 5/2008 | Wang et al. .............. | 713/151 |
| 2008/0152146 A1* | 6/2008 | Conrado et al. ........... | 380/278 |
| 2008/0270579 A1* | 10/2008 | Herz et al. ............... | 709/219 |
| 2009/0240941 A1* | 9/2009 | Lee et al. ................ | 713/169 |
| 2010/0031025 A1* | 2/2010 | Zhang et al. ............. | 713/156 |
| 2010/0191975 A1* | 7/2010 | Chase et al. ............. | 713/176 |

* cited by examiner

*Primary Examiner* — Beemnet Dada
*Assistant Examiner* — Sayed Beheshti Shirazi
(74) *Attorney, Agent, or Firm* — Hulsey P.C.; William N. Hulsey; Loren T. Smith (57) ABSTRACT

The invention relates to a computer implemented method for performing a user authentication, wherein an asymmetric cryptographic key pair is associated with the user, said key pair comprising a public key and a private key, wherein the method comprises selecting the user to be authenticated using a pseudonym of said user, wherein said pseudonym comprises the public key of the user, the method further comprising performing a cryptographic authentication of the user using the asymmetric cryptographic key pair.

12 Claims, 5 Drawing Sheets

COMPUTER IMPLEMENTED METHOD FOR AUTHENTICATING A USER

CLAIM FOR PRIORITY

This application claims the benefit of European Patent Applications No. 10 173 175.0, filed Aug. 18, 2010; No. 10 167 641.9, filed Jun. 29, 2010; No. 10 156 171.0, filed Mar. 11, 2010; and No. 09 179 974.2, Dec. 18, 2009, which are hereby incorporated herein.

FIELD OF THE INVENTION

The present invention relates to a computer implemented method for authenticating a user, a computer readable storage medium and a computer system.

BACKGROUND OF THE INVENTION

Various computer implemented schemes for providing a pseudonym for a user are as such known. A pseudonym is typically used for protecting the informational privacy of a user such as in a social network. Such computer implemented schemes for providing a pseudonym typically enable the disclosure of identities of anonymous users if an authority requests it, if certain conditions are fulfilled. For example, Benjumea et al, Internet Research, Volume 16, No. 2, 2006 pages 120-139 devise a cryptographic protocol for anonymously accessing services offered on the web whereby such anonymous accesses can be disclosed or traced under certain conditions.

A problem occurring in for example social networks is that online communication with another user is always performed with the element of uncertainty that it is not assured that said other user in the online communication is the true user associated with the pseudonym. This problem becomes even more severe in social networks in which absolute user anonymity is desired. There, the pseudonyms of users are selected such as to ensure the anonymity of the user. Hence, an exchange of personal information in order to perform a user authentication is not desired here.

BRIEF SUMMARY OF THE INVENTION

The invention provides a computer implemented method for performing a user authentication, wherein an asymmetric cryptographic key pair is associated with the user, said key pair comprising a public key and a private key, wherein the method comprises selecting the user to be authenticated using a pseudonym of said user, wherein said pseudonym comprises the public key of the user, the method further comprising performing a cryptographic authentication of the user using the asymmetric cryptographic key pair.

Any kind of cryptographic authentication may be used for this case. However, it is preferred to use as the cryptographic authentication a challenge-response procedure for the user authentication, said procedure comprising:

selecting and sending challenge data to the user, receiving in response to said sending encrypted challenge data, wherein the challenge data is encrypted with the private key of the user, and decrypting the encrypted challenge data using the public key of the user, said decryption resulting in decrypted challenge data, or selecting challenge data and encrypting said challenge data with the public key of the user, said encrypting resulting in encrypted challenge data, sending the encrypted challenge data to the user and receiving in response to said sending decrypted challenge data, wherein the user is authenticated in case the decrypted challenge data matches the challenge data.

Embodiments of the invention have the advantage, that a 'blind authentication' can be performed. The user's real identity is kept secret, whereas nevertheless it can be assured that the authenticated user is the true user associated with the pseudonym since it can be assumed that only the user himself possesses his private key and nobody else. No personal data is exchanged for authentication which renders this method perfect in anonymous computer environments.

In accordance with an embodiment of the invention, the pseudonym corresponds to the public key of the user. This simplifies the authentication process since for example the publically available public key of the user key may be directly retrieved and used for the authentication process.

In accordance with an embodiment of the invention, the method further comprises determining if a public key certificate for the public key exists, wherein the successful user authentication requires the existence of the public key certificate.

Generally, a public key certificate is an electronic document which uses a digital signature to bind together a public key with for example information about a social network or online community or a special group of participants the user belongs to.

In an embodiment, it may be sufficient to contact a trusted entity or a certificate authority by sending a query comprising the public key to said entity or authority. In case the public key is registered or known to the entity or authority, this already may indicate that the users' public key and the user are trustworthy.

Such a trusted entity may be for example an entity or a person in a 'web of trust', which is a concept used for example in PGP, GnuPG, and other OpenPGP-compatible systems to establish the authenticity of the binding between a public key and a group of participants the user belongs to. Its decentralized trust model is an alternative to the centralized trust model of a public key infrastructure (PKI), which relies exclusively on a certificate authority. As with computer networks, there are many independent webs of trust, and any user can be a part of, and a link between, multiple webs.

In an exemplary scenario, the authentication may be used in an online community like a social network. By determining if a public key certificate for the public key exists with respect to said social network, it can be ensured that the user really belongs to a group of participants of said social network. Nevertheless, the real users' identity is kept secret.

In accordance with an embodiment of the invention, the method further comprises validating the public key certificate, wherein the successful user authentication requires a successful validation of the public key certificate. Thus, not only the pure availability of a public key certificate but also the validity of its electronic signature may be used as requirement for a successful authentication.

As mentioned above, the method may be performed in an online community. For example, the online community may be a social network. However, the invention is not restricted to social networks but can be used in any kind of online communities, for which user accounts may be created, wherein data may be stored with respect to said created user accounts. The inventive user authentication may then be used prior to communicating data between individual users of the community. Throughout the description an online community is understood as a aggregation of users with the possibility of exchanging data.

In another aspect, the invention relates to a computer implemented method for performing a user authentication, wherein an asymmetric cryptographic key pair is associated with the user, said key pair comprising a public key and a private key, wherein a pseudonym is associated with the user to be authenticated, wherein said pseudonym comprises the public key of the user, the method further comprising performing a cryptographic authentication of the user using the asymmetric cryptographic key pair. For example, a challenge-response procedure may be used for the user authentication, said procedure comprising:

receiving challenge data by the user and returning in response to said reception encrypted challenge data, wherein the challenge data is encrypted with the private key of the user, or receiving encrypted challenge data by the user, decrypting said encrypted challenge data using the private key of the user and returning the decrypted challenge data, wherein the user is authenticated in case the decrypted challenge data matches the challenge data.

In accordance with a further embodiment of the invention, the method comprises generating the private key and/or the public key, the method comprising:

entering a user-selected secret, storing the user-selected secret in a memory, computing the private key by applying an embedding and randomizing function onto the secret, storing the private key in the memory, computing the public key using the private key, the public key and the private key forming the asymmetric cryptographic key pair, erasing the secret and the private key from the memory.

The term 'user-selected secret' is understood herein as any secret data that is selected by or related to a user, such as a user-selected secret password or a secret key, such as a symmetric cryptographic key. Further, the term 'user-selected secret' does also encompass a combination of biometric data obtained from the user and a user-selected password or secret key, such as a biometric hash value of the password or secret key.

The term 'memory' as used herein encompasses any volatile or non-volatile electronic memory component or a plurality of electronic memory components, such as a random access memory.

The term 'embedding function' or 'embedding component' as used herein encompasses any infective function that maps the elements of an n-dimensional space onto elements of an m-dimensional space, where n>m. For the purpose of this invention, we focus on embedding functions where m=1. In accordance with embodiments of this invention n is equal to 2 and m is equal to 1 for combining two elements onto a single element. In one embodiment, a user-selected secret and a public parameter are mapped by the embedding function to the 1-dimensional space to provide a combination of the user selected secret and a public parameter, e.g. a single number that embeds the user selected secret. This single number constitutes the embedded secret. In another embodiment, a first hash value of the user selected secret and a random number are mapped by the embedding function to the 1-dimensional space to provide the embedded secret.

A 'randomizing function' or 'randomizing component' as understood herein encompasses any infective function that provides an output of data values that are located within a predefined interval and wherein the distribution of the data values within the predefined interval is a substantially uniform distribution.

The term 'embedding and randomizing function' as used herein encompasses any function that implements both an embedding function and a randomizing function.

Even though, any known method for generation of asymmetric cryptographic keys may be employed in order to carry out the invention, the embodiment employing the user-selected secret for generating the public key and the private key is particularly advantageous as an extremely high degree of protection of the informational privacy of users is provided. This is due to the fact that an assignment of the user's identity to the user's public key as pseudonym does not need to be stored and that no third party is required for establishing a binding between the pseudonym and the user's identity. In contrast, embodiments of the present invention enable to generate a user's public key in response to the user's entry of a user-selected secret whereby the public key is derived from the user-selected secret. As the user-selected secret is only known by the user and not stored on any computer system there is no way that a third party could break the informational privacy of the user, even if the computer system would be confiscated such as by a government authority.

This enables to store sensitive user data, such as medical data, even in an unencrypted form in a publicly accessible database. The user's public key can be used as a database access key, e.g. a primary key or candidate key value that uniquely identifies tuples in a database relation, for access to data objects stored in the database.

For example medical data is desired to be sent by a doctor to a user's account in a database to be stored for the purpose of later retrieval. By using the above discussed pseudonym, the data can even be stored in a non-encrypted manner in the database since the pseudonym comprises only the public user key which however does not permit establishing a binding between the pseudonym and the user's identity.

Nevertheless, the doctor has to ensure that the account to which the medical data is to be sent does really belong to the desired user. This can be verified using the above discussed authentication method.

Consequently, only the user himself will be able to retrieve his data from his account since he or she is the only person who will be able to know which account in said database belongs to him or her—by means of his user-selected secret from which his public key and thus the pseudonym can be generated.

Further, for example, the database with anonymous data can be used for a decision support system, e.g. in the medical field for evaluating a user's individual medical data and processing the data by rules. The result of the evaluation and processing by rules may be hints and recommendations to the physician regarding the user's health condition and further treatment.

It has to be noted here, that the invention is not limited to data comprising medical data. Any kind of data may be comprised in the messages like video data, text data, image data or voice data of any technical field.

In accordance with an embodiment of the invention, the secret may comprise a user-selected password and/or a secret key and/or biometric data.

In accordance with an embodiment of the invention, at least one public parameter is used for applying the embedding and randomization function. A public parameter may be the name of the user, a further (state of the art) email address of the user or another identifier of the user that is publicly known or accessible. A combination of the user-selected secret and the public parameter is generated by the embedding component of the embedding and randomization function that is applied on the user-selected secret and the public parameter.

The combination can be generated such as by concatenating the user-selected secret and the public parameter or by performing a bitwise XOR operation on the user-selected secret and the public parameter. This is particularly advantageous as two users may by chance select the same secret and still obtain different public keys as the combinations of the user-selected secrets with the user-specific public parameters differ.

In accordance with an embodiment of the invention, the embedding component of the embedding and randomizing function comprises a binary cantor pairing function. The user-selected secret and the public parameter are embedded by applying the binary cantor pairing function on them.

In accordance with an embodiment of the invention, the randomizing component of the embedding and randomizing function uses a symmetric cryptographic algorithm like the Advanced Encryption Standard (AES) or the Data Encryption Standard (DES) by means of a symmetric key. This can be performed by encrypting the output of the embedding component of the embedding and randomizing function, e.g. the binary cantor pairing function, using AES or DES.

In accordance with an embodiment of the invention, the symmetric key that is used for randomization by means of a symmetric cryptographic algorithm is user-specific. If the symmetric key is user-specific, the use of a public parameter can be skipped, as well as embedding the user-selected secret and the public parameter; the randomizing function can be applied then solely on the user-selected secret. By applying a symmetric cryptographic algorithm onto the user-selected secret using a user-specific symmetric key embedding can be skipped and randomization of the user-selected secret is accomplished. If the symmetric key is not user-specific, the use of the public parameter and embedding the user-selected secret and the public parameter are necessary.

In accordance with an embodiment of the invention, the embedding and randomizing function is implemented by performing the steps of applying a first one-way function on the user-selected secret to provide a first value, providing a random number, embedding the random number and the first value to provide a combination, and applying a second one-way function on the combination to provide a second value, wherein the second value constitutes the private key. This embodiment is particularly advantageous as it provides a computationally efficient method of implementing an embedding and randomization function.

In accordance with an embodiment of the invention, the computation of the public key is performed by elliptic curve cryptography (ECC). The private key that is output by the embedding and randomizing function is multiplied with a first base point given by the domain parameters of an elliptic curve to provide another point on the elliptic curve, which is the public key.

In accordance with an embodiment of the invention, it is determined whether the output of the embedding and randomizing function fulfills a given criterion. For example, it is checked whether the output of the embedding and randomization function is within the interval between 2 and n−1, where n is the order of the elliptic curve. If the output of the embedding and randomizing function does not fulfill this criterion another random number is generated and the embedding and randomization function is applied again to provide another output which is again checked against this criterion. This process is performed repeatedly until the embedding and randomizing function provides an output that fulfills the criterion. This output is then regarded as the private key that is used to calculate the public key, by multiplying the private key with the first base point.

In accordance with a further embodiment of the invention the base point is varied leaving the other domain parameters unchanged for computation of multiple public keys for a given user. This provides a computationally efficient way to compute multiple public keys for a given user in a secure way.

In another aspect, the invention relates to a computer program product comprising computer executable instructions to perform any of the method steps described above.

In another aspect, the invention relates to a computer system for user authentication, wherein an asymmetric cryptographic key pair is associated with the user, said key pair comprising a public key and a private key, wherein the system comprises means for selecting the user to be authenticated using a pseudonym of said user, wherein said pseudonym comprises the public key of the user, the system being adapted for performing a cryptographic authentication of the user using the asymmetric cryptographic key pair. Again, preferably a challenge-response procedure may be used for the user authentication, said procedure comprising:

selecting and sending challenge data to the user, receiving in response to said sending encrypted challenge data, [wherein the challenge data is encrypted with the private key of the user,] and decrypting the encrypted challenge data using the public key of the user, said decryption resulting in decrypted challenge data, or selecting challenge data and encrypting said challenge data with the public key of the user, said encrypting resulting in encrypted challenge data, sending the encrypted challenge data and receiving in response to said sending decrypted challenge data, wherein the user is authenticated in case the decrypted challenge data matches the challenge data.

In another aspect, the invention relates to a computer system for user authentication, wherein an asymmetric cryptographic key pair is associated with the user, said key pair comprising a public key and a private key, wherein a pseudonym is associated with the user to be authenticated, wherein said pseudonym comprises the public key of the user, the system being adapted for performing a cryptographic authentication of the user using the asymmetric cryptographic key pair, for example a challenge-response procedure for the user authentication, said procedure comprising:

receiving challenge data by the user and returning in response to said reception encrypted challenge data, wherein the challenge data is encrypted with the private key of the user, or receiving encrypted challenge data by the user, decrypting said encrypted challenge data using the private key of the user and returning the decrypted challenge data, wherein the user is authenticated in case the decrypted challenge data matches the challenge data.

In accordance with an embodiment of the invention, the system further comprises:

means for entering a user-selected secret, memory means for storing the user-selected secret and the private key, processor means being operable to
a) compute the private key by applying an embedding and randomizing function onto the secret,
b) compute the public key using the private key, the public key and the private key forming an asymmetric cryptographic key pair,
c) erase the secret and the private key from the memory.

BRIEF DESCRIPTIONS OF THE DRAWINGS

In the following, embodiments of the invention are explained in greater detail, by way of example only, making reference to the drawings in which.

DETAILED DESCRIPTION OF ILLUSTRATIVE EMBODIMENTS

Throughout the following detailed description like elements of the various embodiments are designated by identical reference numerals.

Figure 1:
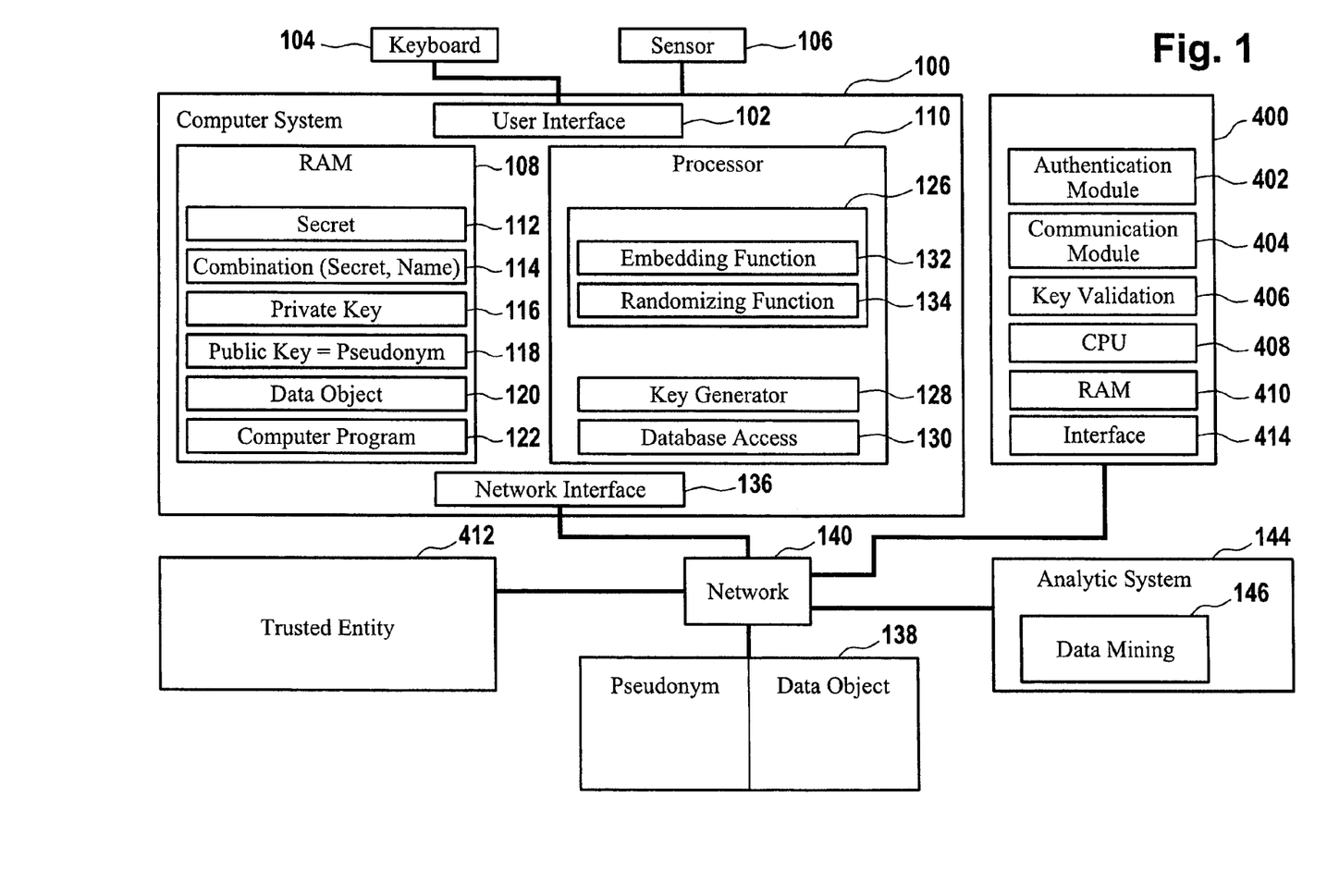
FIG. 1 is a block diagram of a first embodiment of a computer system of the invention.

FIG. 1 shows a computer system 100 that has a user interface 102 for a user's entry of a user-selected secret 112 that is designated as $s_T$ in the following. For example, a keyboard 104 may be coupled to the computer system 100 for entry of $s_T$. Instead of a keyboard 104 a touch panel or another input device can be coupled to the computer system 100 for entry of $s_T$. In addition, a sensor 106 can be coupled to the computer system 100 such as for capturing biometric data from a biometric feature of the user. For example, the sensor 106 may be implemented as a fingerprint sensor in order to provide biometric fingerprint data to the computer system 100.

A public parameter, such as the user's name or email address, can also be entered into the computer system 100 via the keyboard 104 or otherwise. For example, a personal set $V_{T,i}$ containing at least one user-specific public parameter, such as the user's name or email address, is entered into the computer system 100 by the user $T_i$.

The computer system 100 has a memory 108, such as a random access memory, and at least one processor 110. The memory 108 serves for temporary storage of the user-selected secret $s_T$ 112, a combination 114 of $s_T$ 112 and $V_{T,i}$, a private key 116, a public key 118 that constitutes a pseudonym of the user $T_i$, and a data object 120, such as a medical data object containing medical data related to the user $T_i$. Further, the memory 108 serves for loading computer program instructions 122 for execution by the processor 110.

The computer program instructions 122 provide an embedding and randomizing function 126, a key generator 128 and may also provide a database access function 130 when executed by the processor 110.

The embedding and randomizing function 126 may be provided as a single program module or it may be implemented by a separate embedding function 132 and a separate randomizing function 134. For example, the embedding function 132 or an embedding component of the embedding and randomization function 126 provides the combination 114 by concatenating $s_T$ and the user's name or by performing a bitwise XOR operation on $s_T$ and the public parameter.

In one implementation, the embedding and randomizing function 126 implements symmetric encryption provided by a symmetric cryptographic algorithm, e.g. AES, using a user-specific symmetric key for encryption of the user-selected secret 112. This provides both embedding and randomizing of $s_T$ 112.

In another implementation, the embedding function 132 is implemented by a binary cantor pairing function for embedding $s_T$ 112 and $V_{T,i}$, and the randomizing function 134 is implemented by AES encryption using a symmetric key that is the same for the entire set of users T.

Figure 3:
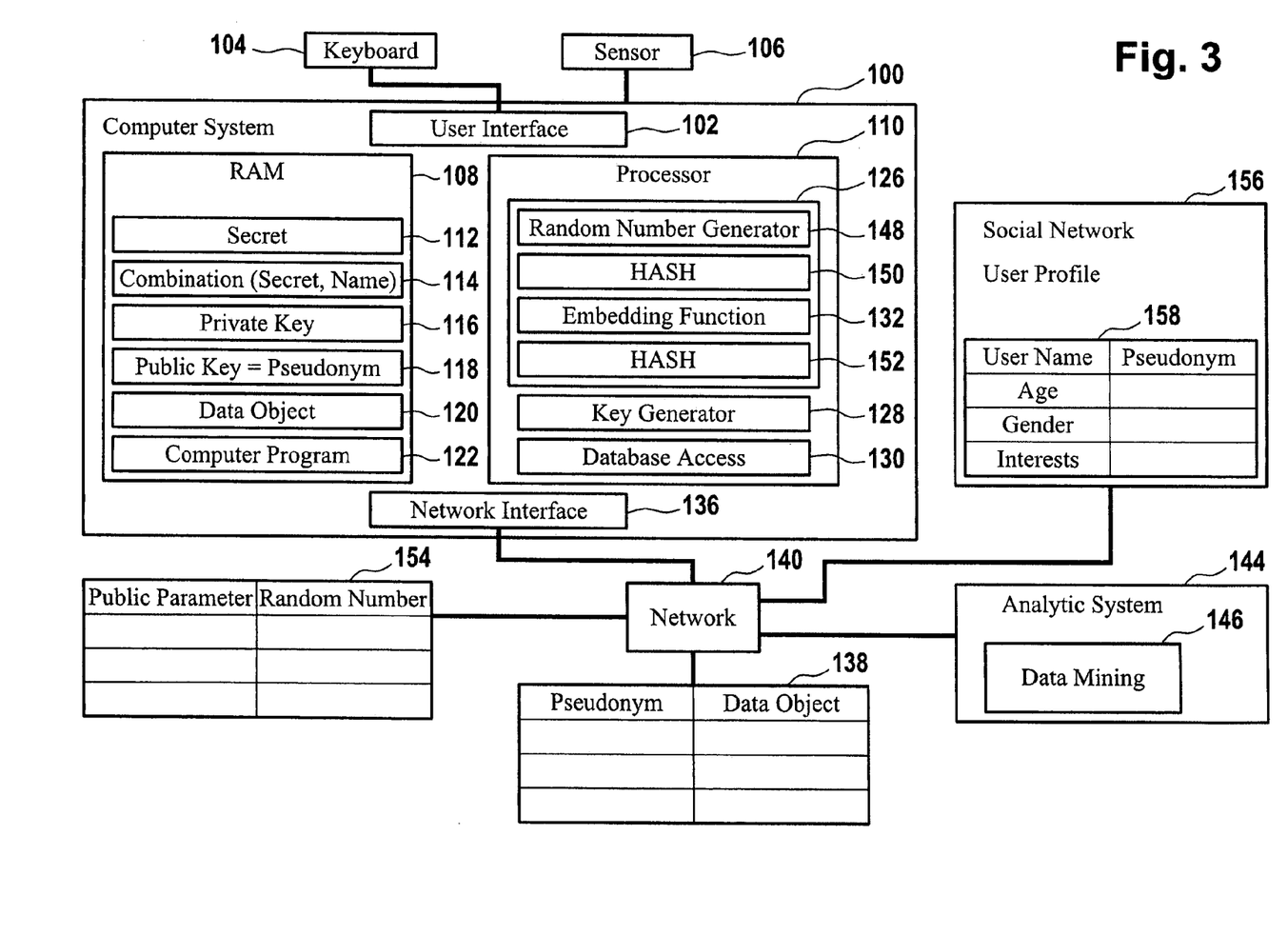
FIG. 3 is a block diagram of a further embodiment of a computer system of the invention.
Figure 4:
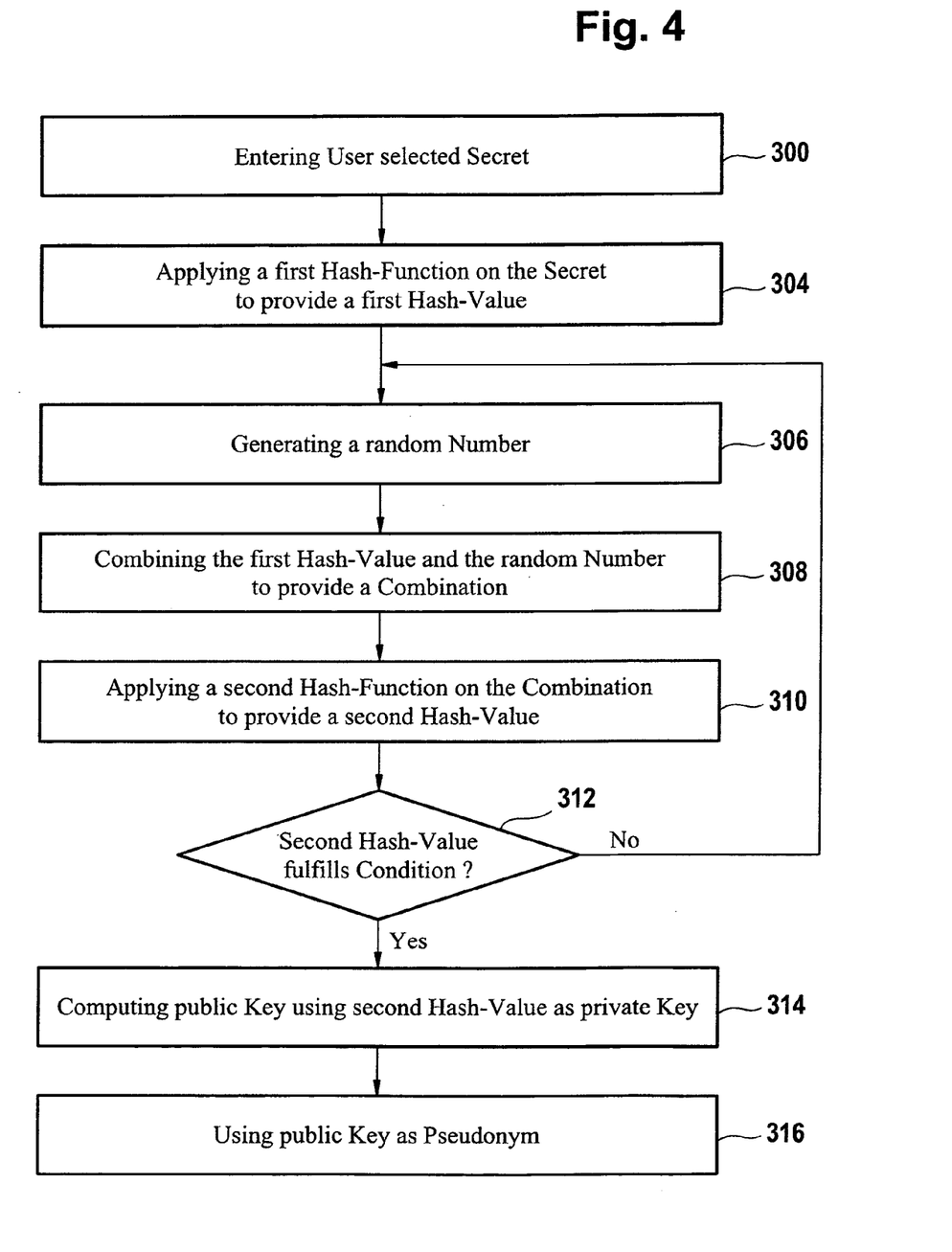
FIG. 4 is a flowchart being illustrative of a further embodiment of a method of the invention.

In still another embodiment the embedding and randomizing function 126 is implemented by two different hash functions and a random number generator (cf. the embodiment of FIGS. 3 and 4).

The key generator 128 serves to compute public key 118 using elliptic curve cryptography (ECC). The private key 116 is multiplied by a base point given by the domain parameters of the elliptic curve which provides the public key 118. By varying the base point and leaving the other domain parameters of the elliptic curve unchanged multiple pseudonyms can be computed for the user $T_i$ on the basis of the same secret $s_T$.

The computer system 100 may have a network interface 136 for coupling the computer system 100 to a database 138 via a communication network 140, such as the Internet. The database access function 130 enables to perform a write and a read access for accessing the data object 120 stored in the database 138 using the public key 118, i.e. the user's pseudonym, as a database access key, e.g. a primary key or candidate key value that uniquely identifies tuples in a database relation.

Further, an analytic system 144, such as a decision support system (DSS) can be coupled to the database 138 such as via the network 140. The analytic system 144 comprises a component 146 for analyzing the data objects of the users T which are stored in the database 138, such as by data mining or data clustering.

In one application the data objects stored in the database 138 contain medical data of the various users. By analyzing the various data objects using techniques such as data mining and/or data clustering techniques medical knowledge can be obtained. For example, data clustering may reveal that certain user attributes contained in the medical data increase the risk for certain diseases.

For generating a pseudonym $p_{T,i}$ for a user $T_i$ based on the secret $s_T$ 112 and domain parameters containing a base point for the elliptic curve cryptography the following steps are executed by the computer system 100 in operation:

The user $T_i$ enters his or her user-selected secret $s_T$ 112 such as via the keyboard 104. In addition, the user may enter at least one public parameter $V_{T,i}$ such as his name or email address via the keyboard 104 or otherwise. Such a public parameter $V_{T,i}$ may also be permanently stored in the computer system 100.

The secret $s_T$ 112 is temporarily stored in memory 108. Upon entry of the secret $s_T$ 112 the embedding function 132 or the embedding component of the embedding and randomizing function 126 generates the combination 114 of the secret $s_T$ 112 and the public parameter $V_{T,i}$. The resultant combination 114 is temporarily stored in the memory 108.

Next, the randomizing function 134 or the randomizing component of the embedding and randomizing function 126 is invoked in order to calculate the private key 116 on the basis of the combination 114. The resultant private key 116 is temporarily stored in memory 108. In the next step, the key generator 128 is started for computing the public key 118 by multiplying the private key 116 by the base point contained in the domain parameters $D_i$ of the elliptic curve being used.

The public key 118, i.e. the pseudonym $p_{T,i}$, is stored in memory 108. The secret $s_T$ 112, the combination 114 as well as the private key 116 as well as any intermediate result obtained by execution of the embedding and randomizing function 126 and the key generator 128 are then erased from the memory 108 and/or the processor 110. As a consequence, there is no technical means to reconstruct the assignment of the resultant pseudonym to the user $T_i$ as only the user knows the secret $s_T$ 112 that has led to the generation of his or her pseudonym $p_{T,i}$. A data object 120 containing sensitive data of the user $T_i$, such as medical data, can then be stored by execution of the database access function 130 in the pseudonymous database 138 using the pseudonym $p_{T,i}$ as a database access key, e.g. a primary key or candidate key value that uniquely identifies tuples in a database relation.

The user-selected secret $s_T$ 112 may be obtained by combining a user-selected password or secret key with biometric data of the user $T_i$ that is captured by the sensor 106. For example, a hash value of the user-selected password or secret key is calculated by execution of respective program instructions by the processor 110. In this instance the hash value provides the user-selected secret $s_T$ 112 on which the following calculations are based.

A plurality of users from the public set of enrolled participants T may use the computer system 100 to generate respective pseudonyms $p_{T,i}$ and to store data objects containing sensitive data, such as medical information in the database 138 as it has been described above in detail for one of the users $T_i$ by way of example.

For reading the data object of one of the users $T_i$ from the database 138 the user has to enter the secret $s_T$ 112. Alternatively, the user has to enter the user-selected password or secret key via the keyboard 104 and an acquisition of the biometric data is performed using the sensor for computation of a hash value that constitutes $s_T$ 112. As a further alternative, the secret key is read by the computer system from an integrated circuit chip card of the user. On the basis of $s_T$ 112 the pseudonym can be computed by the computer system 100.

The pseudonym is then used for performing a database read access on the database 138 in order to read one or more data objects 120 that are stored in the database 138 for that user $T_i$. After the database access operation has been performed the secret $s_T$ 112, the combination 114, the private key 116 and the public key 118 are erased from the computer system 100 as well as any intermediate computational results.

In the following, a preferred embodiment of the invention is described in greater detail with respect to FIG. 1. In this embodiment it is assumed that a user of a computer system 400—in following denoted as user A—wants to authenticate the user of the computer system 100—in the following denoted as user B—in order to be sure that data objects can be stored in the database associated with the pseudonym 118 of the user B, wherein the data storage is performed by user A. For example user A may be a medical doctor who just acquired medical data of user B and who likes to store said medical data in the database 138 associated with the pseudonym 118 of user B. However, for this purpose user A has to make sure that user B is indeed the true user B that is really assigned the pseudonym 118.

As an example, it is assumed that the computer system 100 of user B is comprised in a mobile phone of user B. However, the computer system 100 may also be any stationary home computer system or any other computer system known in the art. The computer system 400 of user A comprises a communication module 404 which may be implemented by hardware or software, wherein through the interface 414 of system 400 the module 404 may communicate with a correspondent module of system 100 of user B (not shown). Authentication of user B may be performed using the software module 402 of the system 400 which also may be implemented by hardware or software, wherein any communication involved in the authentication process is performed via module 404.

For authentication, the module 402 generates challenge data, for example a random number. However, any other kind of suitable challenge data may be employed. In one example, the challenge data are then encrypted using the public key 118 of user B. For example, key 118 may be publically available or communicated before from user B to user A. The encryption results in encrypted challenge data, which are then sent using the module 404 over the interface 414 to the system 100. Sending can for example be performed via the internet or any other suitable network 140.

On reception of the encrypted challenge data by the user B on his mobile phone comprising the computer system 100, said user decrypts the encrypted challenge data using his private key 116. This results in decrypted challenge data. In case, said private key 116 and the public key 118 used before for encryption by user A belong to an asymmetric cryptographic key pair, the decryption process results in the challenge data in plain text. Thereupon, user B sends the plain text challenge data back to the computer system 400 and thus to user A. In case user A notices that the received plain text challenge data corresponds to the plain text data he encrypted before, user A can be sure that user B is the 'real' user B that is owner of the pseudonym 118.

The above mentioned steps can be varied in different manners: for example, instead of sending back plain text challenge data from user B to user A, it may be wise to encrypt the plain text challenge data with a public key of user A and to send the such encrypted challenge data back to user A. This ensures that at no time any non encrypted data is transmitted between the two users.

An alternative approach would be that user A sends the generated challenge data in plain text form to user B, wherein user B encrypts this data with his private key 116. Upon sending back such encrypted challenge data to user A, user A will be able to decrypt the data employing the public key 118 of user B. Again, in case a decryption is successful such that the decrypted challenge data corresponds to the originally generated challenge data of user A, user A can be sure that that user B is the 'real' user B that is owner of the pseudonym 118.

For each generation of the private keys of users A and B, the above outlined method of key generation using respective user-selected secrets may be employed. For this reason, the computer system 400 preferably also comprises a CPU 408 and a RAM 410 which have similar functionality as discussed with respect to the RAM 108 and CPU 110 of system 100. Further, system 400 may also comprise the key generator 128 and the database access module 130 of system 100, which may either be implemented in hardware or software.

However, the general authentication process may be performed with any asymmetric cryptographic key pairs—independently of how these pairs were generated.

Further shown in FIG. 1 is a trusted entity 412 or a certificate authority. This may be a database associated with the database 138, wherein the trusted entity comprises information about the validity of pseudonyms for the database 138.

For authentication purposes, user A with computer system 400 may send a query to the entity 412 by employing the key validation module 406, said query comprising the public key 118 in question of user B. In one example the entity 412 may simply return an answer which states that the public key 118 is indeed a key officially registered with the database 138. Thus, user A knows that at least the public key 118 is trustworthy.

In a more sophisticated example, a public key certificate may be returned from the entity 412 to user A, whereupon the electronic signature of the certificate is checked by user A. Thus, not only the mere existence of a public key certificate but also the validity of its electronic signature is used here as indicator that the public key 118 of user B is trustworthy.

Figure 2:
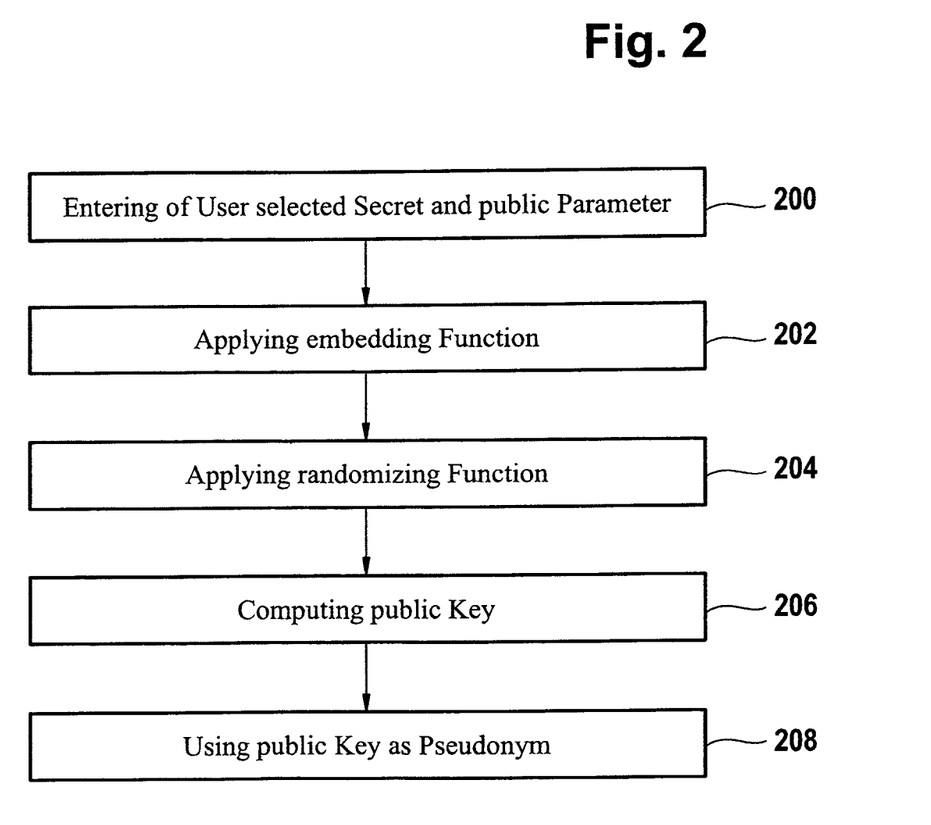
FIG. 2 is a flowchart being illustrative of an embodiment of a method of the invention.

FIG. 2 shows a flowchart of a key generation process.

In step 200 the user $T_i$ enters his or her user-selected secret $s_T$ and public parameter $V_{T,i}$. In step 202 $s_T$ and $V_{T,i}$ are combined to provide the first combination by the embedding function (cf. embedding function 132 of FIG. 1). Next, the randomizing function (cf. randomizing function 134 of FIG. 1), is applied on $s_T$ and $V_{T,i}$ in step 204 which provides a private key. As an alternative, an embedding and randomizing function is applied on $s_T$ and $V_{T,i}$ which provides the private key.

In step 206 a public key is computed using the private key obtained in step 204 and the public key is used in step 208 as a pseudonym of the user $T_i$. For example the pseudonym may be used as a database access key, e.g. a primary key or candidate key value that uniquely identifies tuples in a database relation for storing a data object for the user $T_i$ in a database with pseudonymous data (cf. database 138 of FIG. 1).

FIG. 3 shows a further embodiment of computer system 100. For the case of simplicity, the computer system 400 of FIG. 1 is omitted in FIG. 3. Nevertheless, the setup in FIG. 3 may also be used in an authentication procedure as described above with respect to FIG. 1.

In the embodiment considered in FIG. 3 the embedding and randomizing function 126 comprises an embedding function 132, a random number generator 148, a first hash function 150 and a second hash function 152. In the embodiment considered here the computation of the private key 116 based on $s_T$ 112 may be performed as follows:

The first hash function 150 is applied on the user-selected secret $s_T$ 112. This provides a first hash value. Next, a random number is provided by the random number generator 148. The random number and the first hash value are combined by the embedding function 132 to provide a combination.

The combination of the first hash value and the random number can be obtained by concatenating the first hash value and the random number or by performing a bitwise XOR operation on the first hash value and the random number by the embedding function 132. The result is a combination on which the second hash function 152 is applied to provide a second hash value. The second hash value is the private key 116 on which the calculation of the public key 118 is based.

Dependent on the implementation it may be necessary to determine whether the second hash value fulfills one or more predefined conditions. Only if such conditions are fulfilled by the second hash value it is possible to use the second hash value as the private key 116 for the following computations. If the second hash value does not fulfill one or more of the predefined conditions a new random number is provided by the random number generator 148 on the basis of which a new second hash value is computed which is again checked against the one or more predefined conditions (cf. the embodiment of FIG. 4).

The random number on the basis of which the private key 116 and thereafter the public key 118 has been computed is stored in a database 154 that is coupled to the computer system 100 via the network 140. The random number may be stored in the database 154 using the public parameter $V_{T,i}$ as the database access key for retrieving the random number for reconstructing the pseudonym at a later point of time.

The user $T_i$ may use the pseudonym provided by the computer system 100 for his or her registration in an anonymous online community 156 e.g. a social network. For registration the user $T_i$ creates his or her user profile 158 by entering the pseudonym 118 as the username such that the various private data entered into the user profile 158 remain private even though they are published in the online community 156 due to the fact that the assignment of the pseudonym to the user $T_i$ is stored nowhere and cannot be reconstructed by technical means without knowledge of the user-selected secret $s_T$ 112.

For reconstructing the pseudonym the user has to enter his or her user-selected secret $s_T$ 112 into the computer system on the basis of which the first hash value is generated by the hash function 150 and the combination 114 is generated by the embedding function 132 or the embedding component of the embedding and randomizing function 126 using the first hash value and the random number retrieved from the database 154.

Depending on the implementation, the user may also need to enter the user's public parameter $V_{T,i}$. A database access is performed using the user's public parameter $V_{T,i}$ as a database access key, e.g. a primary key or candidate key value that uniquely identifies tuples in a database relation, in order to retrieve the random number stored in the database 154.

In other words, the reconstruction of the private key 116 is performed by applying the embedding function 132 on the first hash value obtained from the user-selected secret $s_T$ 112 and the retrieved random number which yields the combination 114. The first hash value is combined with the random number retrieved from the database 154 by the embedding function 132 to provide the combination onto which the second hash function 152 is applied which returns the private key 116, out of which the public key 118, i.e. the pseudonym, can be computed. After the user $T_i$ has recovered his or her pseudonym a database access for reading and/or writing from or to the database 138 may be performed or the user may log into the online community 156 using his or her pseudonym for anonymous participation in the online community 156.

FIG. 4 shows a respective flowchart for generating a pseudonym $p_{T,i}$ for user $T_i$. In step 300 the user enters the user-selected secret $s_T$. In step 304 a first hash function is applied on the user-selected secret $s_T$ which provides a first hash value. In step 306 a random number is generated and in step 308 an embedding function is applied on the first hash value and the random number to provide a combination of the first hash value and the random number. In other words, the first hash value and the random number are mapped to a 1-dimensional space, e.g. a single number, by the embedding function. The combination can be obtained by concatenating the random number and the first hash value or by performing a bitwise XOR operation on the first hash value and the random number.

In step 310 a second hash function is applied on the combination which provides a second hash value. The second hash value is a candidate for the private key. Depending on the implementation the second hash value may only be usable as a private key if it fulfills one or more predefined conditions. For example, if ECC is used, it is checked whether the second hash value is within the interval between 2 and n−1, where n is the order of the elliptic curve.

Fulfillment of such a predefined condition is checked in step 312. If the condition is not fulfilled, the control returns to step 306. If the condition is fulfilled, then the second hash value qualifies to be used as a private key in step 314 to compute a respective public key providing an asymmetric cryptographic key-pair consisting of the private key and the public key. In step 316 the public key computed in step 314 is used as a pseudonym such as for accessing a pseudonymous database, participation in an anonymous online community or other purposes.

Figure 5:
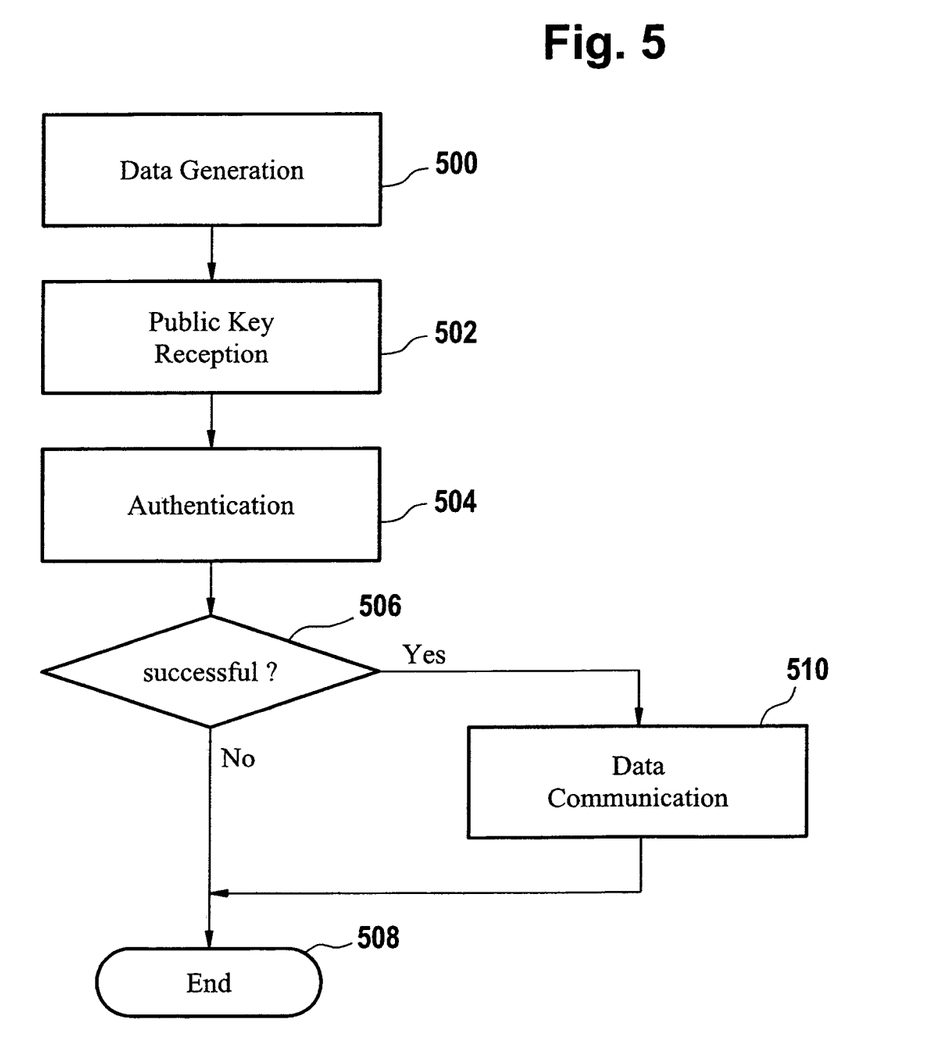
FIG. 5 is a flowchart illustrating a method of user authentication.

FIG. 5 is a flowchart illustrating a method of user authentication. In step 500, data is generated which is to be communicated to a database or directly to a user, wherein the user is identified via a pseudonym, wherein the pseudonym of said user is given by his public key. In step 502, said public key of the user is received, wherein subsequently in step 504 an authentication process as described above is carried out. This authentication process 504 may comprise a challenge-response procedure, as well as a public key validation procedure. This was described above in detail.

In case in step 506 it is determined that the user is authenticated, the method continues in step 510 with the communication of the data previously generated in step 500. Thereupon, the method ends in step 508.

If in step 506 it is determined that the authentication process in step 504 failed, the method directly ends with step 508.

It has to be noted, that this method is not only restricted to communication of data previously generated or acquired. The authentication may also be used in an initialization step for any kind of communication between two parties, wherein the address to which communication is to be directed is given by or comprises the public key of one the parties. Of course, the method requires the preceding selection of the user to be authenticated.

Communication may comprise any synchronous or asynchronous conferencing messages. For example, synchronous conferencing may comprise any kind of data conferencing, instant messaging, Internet Relay Chat (IRC), videoconferencing, voice chat, or VoIP (voice over IP). Asynchronous conferencing may comprise email, Usenet, SMS or MMS.

It has to be noted that it is also possible using any arbitrary kind of pseudonym and to associate said pseudonym to an asymmetric cryptographic key pair.

Mathematical Appendix

1. Embedding Functions.

There exist n-ary scalar functions $$d: N \times N \to N$$

which are infective—and even bijective, where N is the set of natural numbers. The function d( ) embeds uniquely an n-dimensional space, i.e. n-tuples $(k_1, \ldots, k_n)$, into scalars, i.e. natural numbers k.

2. The Binary Cantor Pairing Function

The binary cantor pairing function $\pi$ is an embodiment of embedding function 132. The binary cantor pairing function is defined as follows:

$$\pi: \mathbb{N} \times \mathbb{N} \to N$$

$$\pi(m, n) = \frac{1}{2}(m+n)(m+n+1) + n$$

which assigns to each fraction $$\frac{m}{n}$$

the unique natural number $\pi(m, n)$—thus demonstrating that there are no more fractions than integers. Hence, if we map both $s_T$ and $V_{T,i}$ to natural numbers and use the fact that all identities are distinct then $\pi(s_T, V_T, i)$ yields a unique value for each identity, even if there are equal personal secrets. To be more precise, since this function does not distinguish between e.g.

$$\frac{1}{2}, \frac{2}{4} \text{ect,}$$

it assigns to each fraction an infinite number of unique natural numbers.

3. Elliptic Curve Cryptography (ECC)

Let:

p be a prime number, p>3, and $\mathbb{F}_p$ the corresponding finite field a and b integers Then the set E of points (x, y) such that $$E = \{(x,y) \in \mathbb{F}_p \times \mathbb{F}_p | y^2 = x^3 + ax + b\} \tag{F1}$$

defines an elliptic curve in $\mathbb{F}_p$. (For reasons of simplicity, we skip the details on E being non-singular and, as well, we do not consider the formulae of elliptic curves over finite fields with p=2 and p=3. The subsequent statements apply to these curves, too.)

The number m of points on E is its order.

Let $P, Q \in E$ be two points on E. Then the addition of points $$P + Q = R \text{ and } R \in E \tag{F2}$$

can be defined in such a way that E forms an Abelian group, viz, it satisfies the rules of ordinary addition of integers. By writing $$P + P = [2]P$$

We define the k-times addition of P as [k]P, the point multiplication.

Now EC-DLP, the elliptic curve discretionary logarithm problem, states that if $$Q = [k]P \tag{F3}$$

then with suitably chosen a, b, p and P, which are known to public, and the as well known to the public point Q it is computationally infeasible to determine the integer k.

The order n of a point P is the order of the subgroup generated by P, i.e. the number of elements in the set $$\{P, [2]P, \ldots, [n]P\} \tag{F4}$$

With all this in mind we define an elliptic curve cryptographic (ECC) system as follows. Let:

E be an elliptic curve of order m $B \in E$ a point of E of order n, the base point Then $$D = \{a, b, p, B, n, co(B)\} \tag{F5}$$

with $$co(B) = \frac{m}{n}$$

defines a set of domain ECC-parameters. Let now g be an integer and $$Q = [g]B \tag{F6}$$

Then (g, Q) is an ECC-key-pair with g being the private key and Q the public key.

For we rely on findings of Technical Guideline TR-03111, Version 1.11, issued by the Bundesamt für Sicherheit in der Informationstechnik (BSI), one of the best accredited source for cryptographically strong elliptic curves, we can take that m=n, i.e. co(B)=1, and hence reduce (F5) to $$D = \{a, b, p, B, n\} \tag{F7}$$

Now we can define our one-way function. Let D be a set of domain parameters concordant with (F7). Then $$f:[2,n-1] \to E\ k \mapsto [k]B \qquad (F8)$$

i.e. the point multiplication (F6), is an infective one-way function.

4. Implementing Key Generator Based on ECC

The key generator 128 (cf. FIGS. 1 and 3) can be implemented using ECC.

DEFINITIONS

There are public sets of ECC-domain parameters $D_1$, $D_2$, ... concordant with (F7)

$$D_i = \{a_i, b_i, p_i, B_i, n_i\} \qquad (F9)$$

There are public functions: an embedding function d( ), a randomising function r( ) and our one-way function f( ) defined by (F8).

There is a public set of enrolled participants (users)

$$T = \{T_1, T_2, \dots\} \qquad (F10)$$

Note that a $T_i$ does not necessarily possess any personally identifying details, i.e. we assume that T resembles the list of participants in an anonymous Internet-community, in which each participant can select his name at his discretion as long as it is unique.

Each participant T∈T chooses at his complete discretion his personal secret $s_T$. In particular, for this secret is never revealed to anybody else—it is the participant's responsibility to ensure this—it is not subject to any mandatory conditions, such as uniqueness.

Our public key derivation function is $$h(\ ) = f(r(d(\ ))) \qquad (F11)$$

with the following properties:
Given a T∈T with his $s_T$, a $D_i$ and T, $D_i \in V_{T,i}$ $$r(d(s_T, V_{T,i})) = g_{T,i} \qquad (F12)$$

where $g_{T,i}$ is a unique and strong, i.e. sufficiently random, private ECC-key for $D_i$.

The public key $p_{T,i}$ corresponding to T, $s_T$ and $D_i$ is $$p_{T,i} = f(g_{T,i}, D_i) = [g_{T,i}]B_i = (x_{T,i}, y_{T,i}) \qquad (F13)$$

There is a public set of public keys $$P = \{p_1, p_2, \dots\} \qquad (F14)$$

such that P comprises one or more public keys for each participant in T computed according to (F11). This wording implies that here is no recorded correspondence between a participant in T and his public keys in P, i.e. each $p_{T,i}$ is inserted in an anonymous way as $p_k$ into P.

Remarks:
The use of multiple domain parameters enables us to endow a single participant with a single personal secret with multiple public keys. This in turn enables a participant to be a member of multiple public keyous groups such that data of these groups cannot—for, e.g. personal or legal reasons—be correlated. Therefore, attempts to exploit combined public keyous profiles for unintended, possibly malicious purposes, are of no avail.

The distinction between two sets of domain parameters $D_i$ and $D_j$ can be minor. In accordance with our principle to use only accredited domain parameters, e.g. those listed in BSI TR-03111, we can set $$D_i = \{a, b, p, B, n\} \qquad (F15)$$

by swapping B for a statistically independent $B_2$, i.e. by choosing a different base point, we can set $$D_j = \{a, b, p, B_2, n\} \qquad (F16)$$

For $D_i$ and $D_j$ refer to the same elliptic curve we can have only one function (F12) and introduce the crucial distinction with (F13). This vastly simplifies concrete implementations—we select a suitable curve and vary the base points only.

LIST OF REFERENCE NUMERALS

100 Computer system
102 User interface
104 Keyboard
106 Sensor
108 Memory
110 Processor
112 A user-selected secret
114 Combination
116 Private key
118 Public key
120 Data object
122 Computer program instructions
126 Embedding and randomizing function
128 Key generator
130 Database access
132 Embedding function
134 Randomizing function
136 Network interface
138 Database
140 Network
144 Analytic system
146 Data Analysis Component
148 Random number generator
150 Hash function
152 Hash function
154 Database
156 Social Network
158 User profile
400 computer system
402 authentication module
404 communication module
406 key validation module
408 CPU
410 RAM
412 Trusted entity
414 Interface

What is claimed is:

1. A computer implemented method for performing a user authentication, the method comprising the following steps performed on a hardware processor:
generating a private and a public key, comprising the following steps: entering a user-selected secret,
storing the user-selected secret in memory,
computing the private key by applying an embedding and randomizing function onto the secret and additional values, storing the private key in memory,
computing the public key using the private key, the public key and private key forming the asymmetric cryptographic pair, and
erasing the secret and the private key from memory,
associating an asymmetric cryptographic key pair with the user, said user having an identity, said key pair comprising the public key and the private key,
selecting the user to be authenticated using a pseudonym of said user, wherein said pseudonym comprises the public key of the user, wherein information linking said pseudonym to said identity of said user is not stored, and performing cryptographic authentication of the user using the asymmetric cryptographic key pair.

2. The method of claim 1, wherein the cryptographic authentication comprises a challenge-response procedure for the user authentication, said procedure comprising:

selecting and sending challenge data to the user, receiving in response to said sending encrypted challenge data, and decrypting the encrypted challenge data using the public key of the user, said decryption resulting in decrypted challenge data, or selecting challenge data and encrypting said challenge data with the public key of the user, said encrypting resulting in encrypted challenge data, sending the encrypted challenge data and receiving in response to said sending decrypted challenge data, wherein the user is authenticated in case the decrypted challenge data matches the challenge data.

3. The method of claim 1, wherein the pseudonym corresponds to the public key of the user.

4. The method of claim 1, further comprising determining when a public key certificate for the public key exists, wherein the successful user authentication requires the existence of the public key certificate.

5. The method of claim 4, further comprising validating the public key certificate, wherein the successful user authentication requires a successful validation of the public key certificate.

6. The method of claim 5, wherein the determination when the public key certificate for the public key exists comprises sending a query to a certificate authority or a trusted entity, wherein the query comprises the public key, wherein in response to said query the public key certificate is received.

7. The method of claim 1, wherein the method is performed in an online community.

8. The method of claim 1, wherein the cryptographic authentication comprises a challenge-response procedure for the user authentication, said procedure comprising:

receiving challenge data by the user and returning in response to said reception encrypted challenge data, wherein the challenge data is encrypted with the private key of the user, Or receiving encrypted challenge data by the user, decrypting said encrypted challenge data using the private key of the user and returning the decrypted challenge data.

9. The method of claim 1, wherein the embedding and randomizing function comprises:

applying a first one-way function on the secret to provide a first value, providing a random number, embedding the random number and the first value by combining them to provide a combination, and applying a second one-way function on the combination to provide a second value, wherein the second value constitutes the private key.

10. The method of claim 9, wherein the computation of the public key is performed by ECC cryptography.

11. A non-transitory computer readable medium encoded with program capable of execution on a computer, the program comprising the following steps:

generating a private and a public key, wherein generating the private key and public key comprising the following step:

entering a user-selected secret, storing the user-selected secret in memory, computing the private key by applying an embedding and randomizing function onto the secret and additional values, storing the private key in memory, computing the public key using the private key, the public key and private key forming the asymmetric cryptographic pair, and erasing the secret and the private key from memory, associating an asymmetric cryptographic key pair with the user, said user having an identity, said key pair comprising the public key and the private key, selecting the user to be authenticated using a pseudonym of said user, wherein said, wherein information linking said pseudonym to said identity of said user is not stored, and performing cryptographic authentication of the user using the asymmetric cryptographic key pair.

12. A computer system for user authentication, the system comprising:

a hardware processor, an asymmetric cryptographic key pair associated with the user, said user having an identity, said key pair comprising a public key and a private key, and pseudonym associated with the user to be authenticated, wherein said pseudonym comprises the public key of the user, wherein information linking said pseudonym to said identity of said user is not stored, the system being adapted for performing on a hardware processor a cryptographic authentication of the user using the asymmetric cryptographic key pair, wherein the hardware processor adapted to generate the private and the public key, by receiving a user-selected secret, storing the user-selected secret in memory, computing the private key by applying an embedding and randomizing function onto the secret and additional values, storing the private key in memory, computing the public key using the private key, the public key and private key forming the asymmetric cryptographic pair, and erasing the secret and the private key from memory.

* * * * *